United States Patent [19]

Zolkind

[11] 4,218,161
[45] Aug. 19, 1980

[54] ARRANGEMENT FOR COUPLING A DRILL JIG TO AN INDEXING APPARATUS

[76] Inventor: Jack I. Zolkind, 1514 Eric La., East Meadow, N.Y. 11554

[21] Appl. No.: 867,013

[22] Filed: Jan. 5, 1978

[51] Int. Cl.³ .................. B23B 49/02; B23Q 21/00
[52] U.S. Cl. ................................ 408/89; 408/107; 408/115 B
[58] Field of Search .................. 408/71, 72 R, 72 B, 408/87, 89, 90, 104, 107, 115 R, 115 B; 33/185 R, 168 B; 292/173

[56] References Cited

U.S. PATENT DOCUMENTS

| | | | |
|---|---|---|---|
| 1,293,009 | 2/1919 | Blaustein | 408/115 X |
| 1,604,540 | 10/1926 | Taggart, Jr. | 292/173 |
| 2,295,022 | 9/1942 | Yanchek | 408/115 X |
| 2,369,425 | 2/1945 | Becker | 33/185 R |
| 2,484,758 | 10/1949 | Sonnie | 408/115 X |
| 2,539,597 | 1/1951 | Staples | 33/185 R |
| 2,817,253 | 12/1957 | Kulusic | 408/87 |
| 3,201,161 | 8/1965 | Castle | 292/173 |

*Primary Examiner*—John Sipos
*Attorney, Agent, or Firm*—Posnack, Roberts, Cohen & Spiecens

[57] ABSTRACT

A coupling arrangement for mounting a drill jig in selected position on a Hardinge-type fixture. An arm carries a drill bushing, through which the drill passes into a workpiece held by a Hardinge fixture. Adjustment of the arm relative to the fixture is provided by the use of gauging blocks which enable the arm to be preset. The coupling arrangement assures proper movement and location of the bushing relative to the fixture.

4 Claims, 10 Drawing Figures

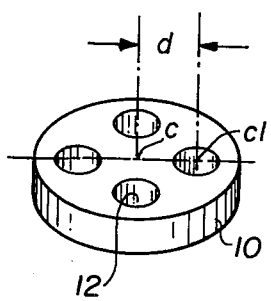
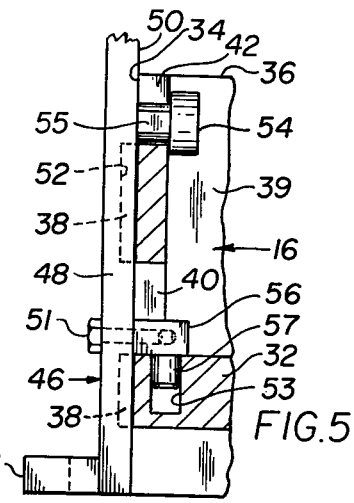
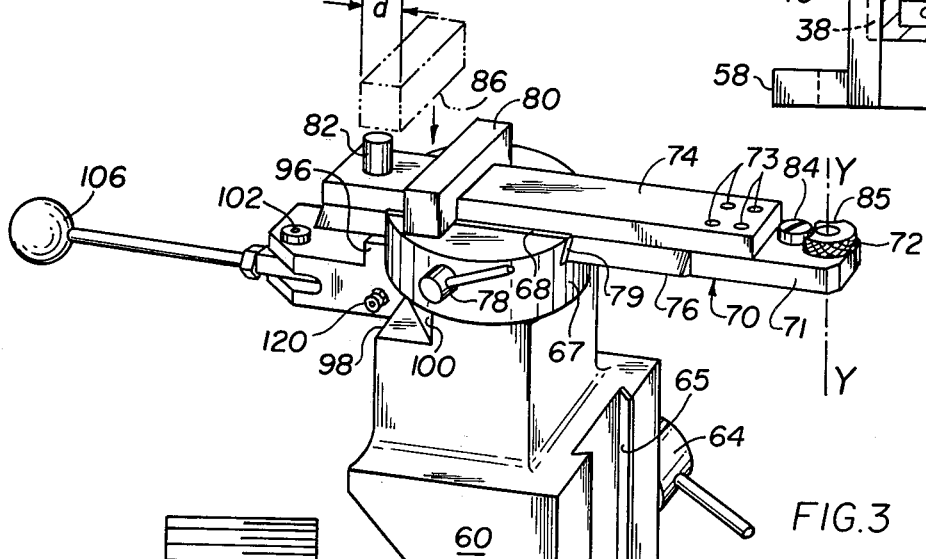
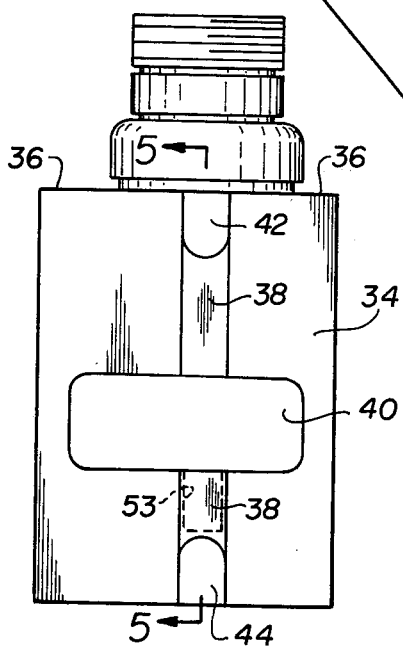
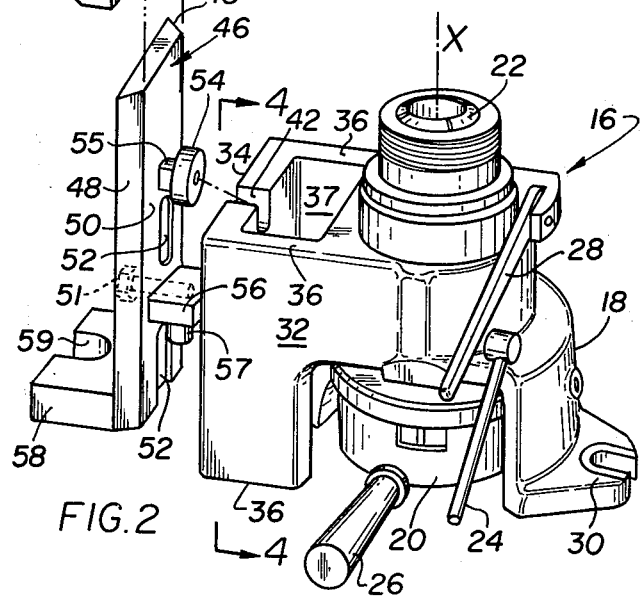
FIG.1
FIG.5
FIG.3
FIG.4
FIG.2

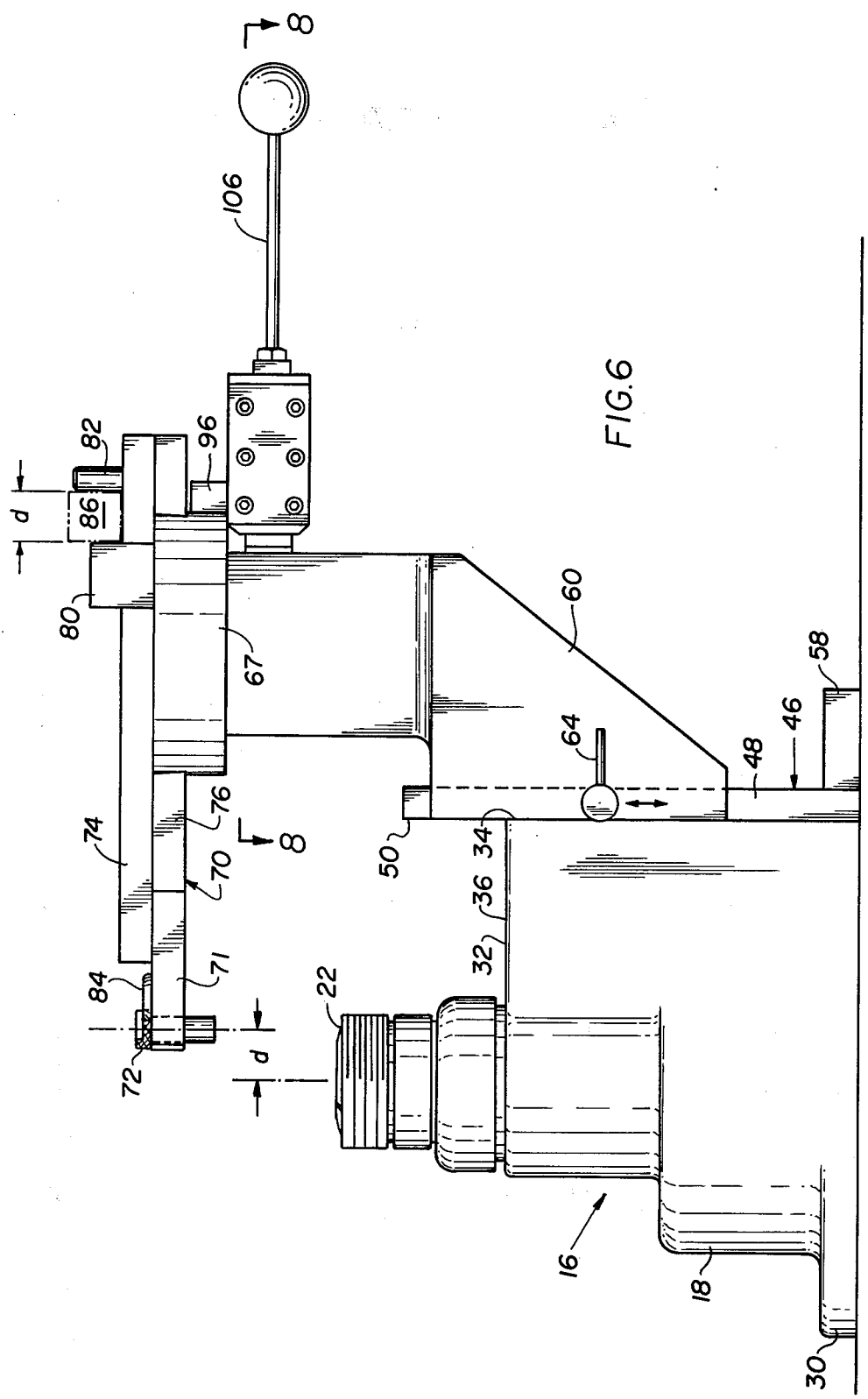

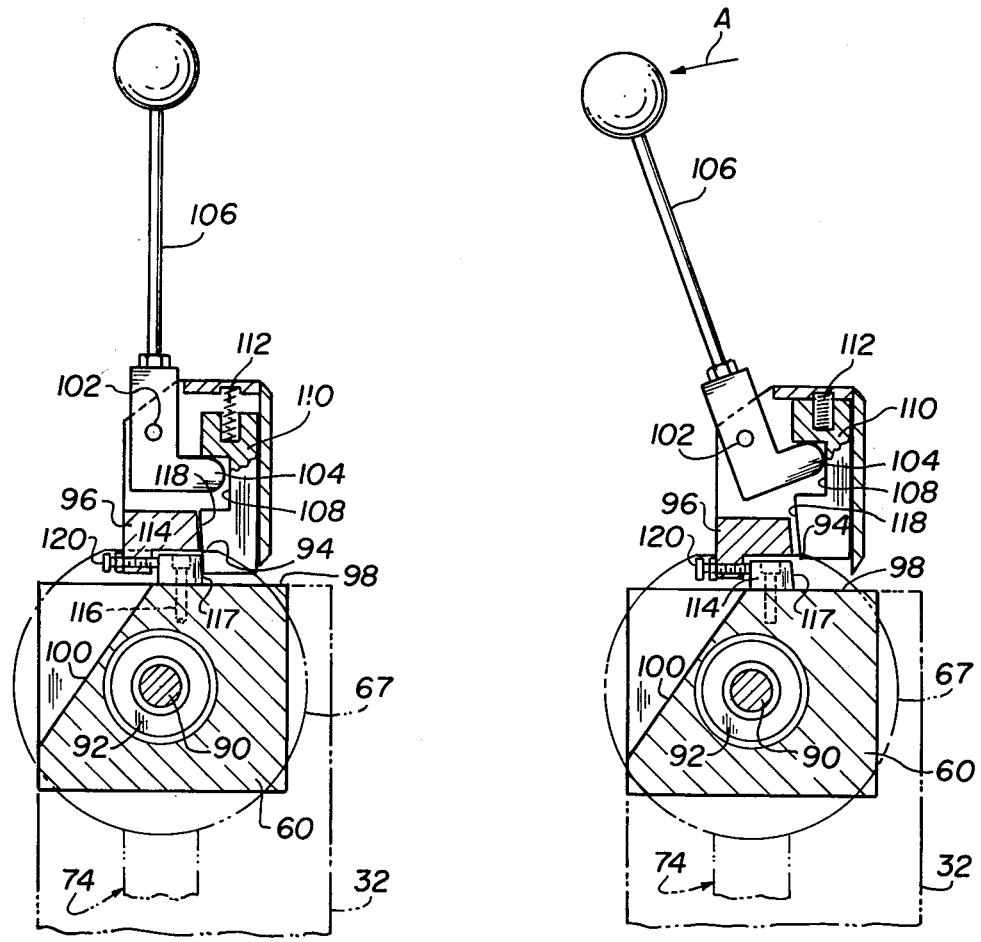
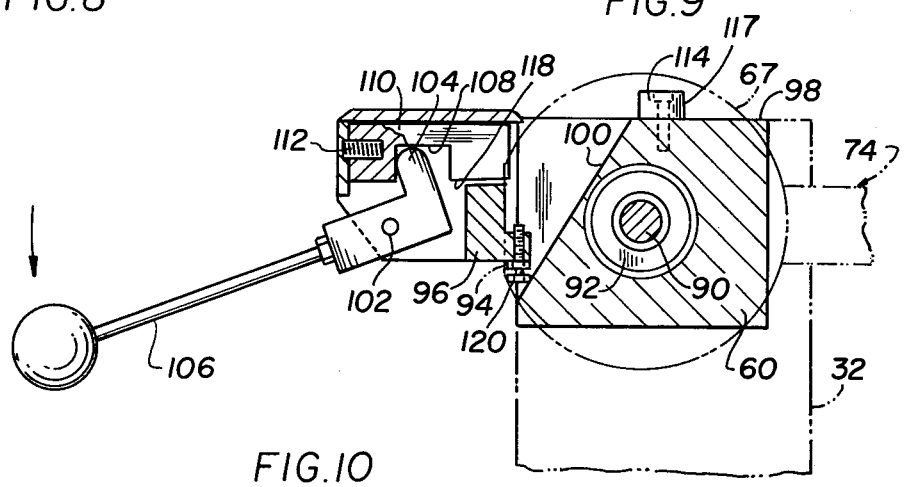
FIG. 8  FIG. 9  FIG. 10

ARRANGEMENT FOR COUPLING A DRILL JIG TO AN INDEXING APPARATUS

BACKGROUND OF THE INVENTION

The present invention relates to constructions of a coupling arrangement for connecting drill jigs for use in conjunction with "Hardinge" type collet and indexing fixtures.

A Hardinge fixture is a well known and commonly used fixture which is employed in conjunction with hand and/or automatic drilling machines to secure workpieces in position for drilling. The fixture comprises a base which is fastened to the bed plate of a drilling machine and will support a collet adapted to hold a workpiece about its periphery so that the drill can pass through its opposing faces. The collet is supported in a turret which is rotatable about its central axis so as to index the workpiece in proper alignment with the drill. Hardinge fixtures can be used in vertical drill or horizontal drilling machines.

Notwithstanding the versatility of the Hardinge fixture, it is difficult to drill a circular arrangement of holes in disk type or flat workpieces concentric with the center thereof, since the turret operation of the Hardinge fixture is rotatable about the collet axis only and because the drill, being flexible, may not center itself on its own true axis.

Moreover, to drill circular arrangements of holes of different diameters, it has been necessary to custom make jigs for each such arrangment.

SUMMARY OF THE INVENTION

It is an object of the present invention to provide an improved drill jig with a means for connecting the same so that it can be used in conjunction with a Hardinge type fixture in such a manner as will increase the versatility of the fixture and will permit the selective drilling of circular patterns of holes with the patterns having different diameters and with a minimum of displacement of the drill about its own axis or the necessity of first drilling accurate starting holes.

These objects and advantages as well as others are achieved in accordance with the invention by the provision of a horizontally movable arm, located in a swingable turret mounted on a body, the body being adjustably mounted in vertically selected position on the Hardinge-type fixture. The arm carries a drill bushing through which the drill passes into the workpiece held by the Hardinge fixture. The hole in the drill bushing is a close running fit to the body of the drill and prevents the drill from moving out of its true axis.

A primary aspect of the present invention resides in the manner of and structure for coupling the arm to the Hardinge fixture, the adjustment of the arm relative to the workpiece being enabled by gauging blocks which enables the arm to be preset. Thus, a specific distance from a point on the workpiece, preferably the center of the workpiece, can be established and maintained for successive and repetitive drilling operations. In addition, a arm is mounted on the turret so as to be movable in and out of operative position above the Hardinge fixture, thereby allowing the workpiece to be inserted and removed from the fixture without varying the previously predetermined setting and position of the arm.

Various other aspects of the present invention are set forth in the following description of the preferred embodiment.

BRIEF DESCRIPTION OF THE DRAWINGS

In the following description, reference is made to the accompanying drawings in which:

FIG. 1 is a perspective view of a sample workpiece which may be formed utilizing the apparatus of the present invention;

FIGS. 2 and 3 are exploded views of the assembly of the present apparatus with a "Hardinge fixture" of more or less general design, FIG. 2 showing the mounting arrangement for the drill jig in accordance with the invention, while FIG. 3 shows the body and drill jig of the present invention;

FIG. 4 is a side elevational view of the inventive fixture taken along lines 4—4 of FIG. 2;

FIG. 5 is a sectional view of the inventive mounting arrangement and Hardinge fixture taken along lines 5—5 of FIG. 4;

FIG. 6 is a side elevational view of the present apparatus in conjunction with the Hardinge fixture, as mounted upon the bed of a drill, the drill itself not being shown;

FIGS. 8, 9 and 10 are a sequence of views showing the movement of the drill jig between loading and unloading work positions.

DESCRIPTION OF THE INVENTION

Figure 7:
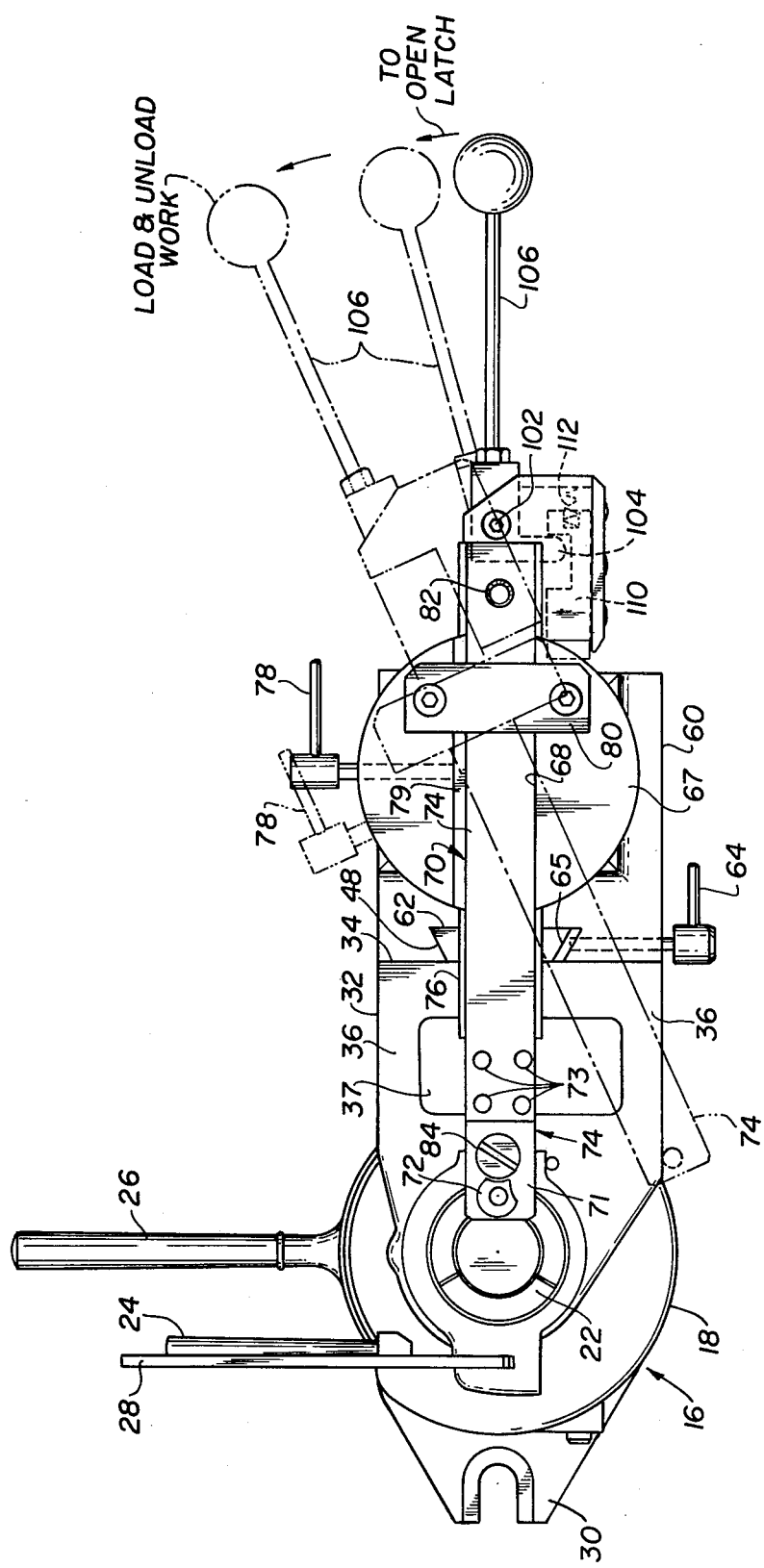
FIG. 7 is a plan view of the assembly shown in FIG. 6.

In FIG. 1 is illustrated one type of workpiece produced by employing the present invention in conjunction with a Hardinge fixture. This workpiece is, by way of example, a generally flat disk or plate-like member 10 having a center about which a plurality of holes 12 are drilled. The holes are concentric with the center c and each has a center cl. However, according to the purpose of the present invention, it is desired that the holes be of a precise but selectively adjustable radial distance from the center c. An object of the present invention is to insure that the drill be properly positioned radially relative to the center of the workpiece so as to insure that the distance d between the centers c and cl for each opposing hole is formed identically and is selectively adjustable. Moreover, it is a feature of the invention to provide a mounting fixture to assure the accurate achieving of this object.

In FIG. 2, a Hardinge-type fixture, generally depicted by the numeral 16, is shown for the purpose of illustrating the present invention. The Hardinge fixture comprises a housing 18 for a rotatable turret 20 on the upper end of which is seated a collet 22 into which the workpiece 10 will fit. The turret is provided with a releasable locking handle 24, a collet tightening handle 26 and an indexing handle 28 by which the collet 24 is manually indexed about its central axis. In this manner the workpiece may be held and is gradually moved about its center placing the workpiece in position for more than one drilling. The degree of movement, i.e. rotation, may be controlled to provide holes at specified distances from each other.

The base or housing 18 of the Hardinge fixture is conventionally provided with a footing or flange 30 having a U-shaped opening into which a bolt, screw or other means is inserted to fasten or tie down the fixture securely to the base plate of the drill bed. Extending from the opposite side of the housing 18 is a web-like structure 32 having a vertical wall or surface 34 joining two vertical walls or surfaces 36 to form an open interior 37. The surface 34 extends in a vertical plane parallel to the axis of the collet, perpendicular to the footing flange 30 and comprises a generally flat surface on which is formed a central spline 38 extending or projecting outwardly therefrom. Intersecting the spline is a transverse slot 40 which opens into the interior 37 of the web. The spline 38 terminates short of both the upper and lower edges of the surface 34 which surface is formed with inwardly directed slots 42 and 44, on a line with the spline.

The lower surfaces of walls 36 of the fixture web 32 are formed by the edges of the web walls in a manner coplanar with the lower surface of the footing flange 30. The edges defining the lower surfaces of walls 36 and the footing flange 30 cooperate to permit the fixture to be stood or positioned stably on the drill bed with the axis of the collet in a perpendicular position to the bed, while the surface 34 permits similar stable positioning of the fixture with the axis of the collet in a parallel or in a horizontal position relative to the bed. Further description of the conventional Hardinge fixture is not necessary to illustrate the structure and the function of the present invention. In connection with the present invention, the Hardinge fixture is intended to be used in its illustrated vertical position, clamped in a fixed position on a drill bed with the jig of the present invention secured to the vertical face 34 as seen in the exploded view of FIG. 2 and in the assembled view of FIG. 7.

As further seen in FIG. 2, the present invention provides a drill jig comprising a mounting plate 46 that has dovetailed side edges 48 tapering outwardly from its front face 50. The front face has a pair of partially through or blind slots 52 which conform to the spline 38 permitting the plate 46 to be abutted flush against the surface 34 of the Hardinge fixture with the slots 52 fitting over and receiving the splines 38. In addition, the front face 50 is provided with an enlarged locking bolt 54, the neck 55 of which fits through the upper slot 42 to position the bolt inside the interior opening 37 to hold the plate 46 tight against the wall 34 of the web 32.

In addition, an L-shaped block 56 is supported by tightening bolt 51 against the front face 50 of the plate 46 so that it moves into slot 40 and its depending finger 57 extends down over the lower edge of the transverse slot 40 in hook like engagement in hole 53 (FIG. 5) behind the face 34 so as to support the plate 46 on the fixture 16. Thus, the mounting plate 46 can be secured to the vertical face 34 of the Hardinge fixture 16 in fixed and proper position by a combination of the spline 38 and slots 52, the securing bolt 54 and slot 42, and the L-shaped member 56 and hole 53 when the tightening bolt 51 is tightened to pull the block 56 toward the plate 46.

The mounting plate 46 is of a length which at least from the securing bolt 54 to its lower edge is identical with the similar or corresponding length of the web face 34 so that the lower edge of the mounting plate is coplanar with the lower edge 36 of the Hardinge fixture. Integrally or unitarily formed with the rear face of the mounting plate 46 is a footing flange 58 having a U-shaped opening 59 which may be secured by screw or bolt to the drill bed in any known manner. Thus, when the mounting plate 46 is mounted on the Hardinge fixture, it becomes an integral unit with the Hardinge fixture and by tying or bolting down each of the flanges 30 and 58, the Hardinge fixture and drill jig can be mounted securely to the drill bed in a vertical position.

The drill jig includes a generally parallelpiped body 60, one face of which is provided with a dovetailed groove 62 adapted to fit over the dovetailed mounting plate 46. The dovetailed groove is further provided with a manually releasable locking member 64 that operates a clamp 65 to releasably engage the plate 46 so that the body 60 may be firmly secured to the mounting plate 46 in any vertical position of adjustment therealong.

Mounted at the upper end of the body 60 is a turret member 67, which is adapted to pivot about a vertical axis. A dovetailed groove 68 is formed in turret 67, the bottom surface of which lies perpendicular to the groove 62 so that it will be parallel to the drill bed. Slidably mounted within the dovetailed groove 68 is a carrying arm 70 at the end of which is a drill bushing support 71 mounting a drill guide bushing 72. The drill bushing support 71 and its bushing 72 may be accurately assembled to the arm 70 at the combination of positioning pins and bolts 73 to enable substitution of such supports 71, each of which may have its own bushing 72. The arm 70 may be made in two parallel abutting sections, or may be of a single piece provided, however, that portion 74 thereof lies above the surface of the turret.

The lower portion of the arm 70 is provided along its sides with a beveled edge 76 conforming to the dovetailed groove 68, a manually operable locking screw 78 operating a clamp 79 is located in the turret to lock the arm 70 in any adjusted position. The upper portion 74 of the arm forms a strengthening and gauging bar adapted to slidably fit within a bridging member 80 which is fastened to the turret, so as to be fixed with respect to it. The bushing 72 may be replaceable as desired, it being held by a screw 84 in operable engagement with a shoulder of a selected one of several positioning notches 85 provided in the bushing.

When the lock 78 is released, so, too, is the clamp 79 from its cooperative locking engagement with the arm 70 to permit it to slide linearly. Linear adjustment movement of the arm 70 permits location of the axis y—y of the drill bushing 72 above the collet 22 so as to have a predetermined spacing in line with or eccentric with respect to the axis x of the collet 22. This adjustment of the arm 70 and, hence, the positioning of the bushing 72 for operation is precisely controlled by inserting a predetermined or precisely measured gauging block 86 between the gauging bridge 80 and an upward projecting gauging pin 82 affixed to the arm. When the arm is adjusted to the gauging block, the clamp 79 is reapplied by the operation of the lock 78 and the block 86 is then withdrawn from between the gauging members 80 and 82.

It will be seen from the foregoing that measurement of the distance d (FIG. 1), or the radius of the center of the hole 12 to be drilled from the center c of the workpiece need not be computed by the operator. The use of a selected predeterminedly sized gauging block 86 requires only that the bushing 72 be located in its required position with respect to and over the collet axis x and upon removal of the block 86 successive holes all concentric with the collet axis x can be made without any adjustment thereafter.

The turret 67 is mounted on the body 60 so as to be pivotable between a working guiding position as seen in full lines in FIGS. 3, 6, 7 and 8 and its inoperative or non-working position as seen in dash lines in FIG. 7 and in FIGS. 9 and 10. In its inoperative position the bushing 72 is swung away from the collet 22 to permit access to the workpiece held in it so as to enable the workpiece to be removed therefrom. However, in order to ensure that the arm 74 and bushing 72 are positioned in exactly the same working position upon its return for operation with a subsequent workpiece, and that the arm and bushing are locked in this position for proper operation, a novel latch and handle mechanism is provided.

As seen in FIGS. 7 through 10, the turret 67 is mounted on a vertical post 90 set within the body 60 and is provided with an axial bearing 92, permitting its free rotation. Attached to the rear portion 94 of the peripheral wall of the turret 67, which is preferably cut to form a flat chordal section perpendicular to the longitudinal axis of the dovetailed groove 68, is a boss 96. The boss 96 depends below the turret in such a manner that it lies in opposition to the rear face 98 of the body 60 and is connected to the turret 67 so that the turret and the boss are conjointly pivotal. To permit pivoting of the turret 67 and boss 96, the corner portion 100 of the body 60 is chamfered and cut away as at 100.

Mounted within the boss 96 to swing in a horizontal plane about a vertical pivot pin 102 is an L-shaped latch member having a short arm 104 and the long arm of which is connected to an outwardly extending handle 106. The short arm 104 extends into a vertical slot 108 of boss 96 to actuate a freely movable bolt 110 normally biased by a spring 112 toward the rear wall 98 of the body 60. Mounted to the rear wall 98 of the body is a rectangular blocking member 114. The blocking member 114 may be fixedly secured, as by the use of a screw or bolt 116, to the rear face 98 of the body 60 and is positioned such that the tapered front face 118 of the freely movable bolt 110, on action of the biasing spring 112, engages the tapered side wall 117 thereof.

As seen in FIGS. 8, 9 and 10, the boss 96 is further provided with an adjustment screw 120 extending laterally inward toward the blocking member 114. The screw 120 is adjustable in position so as to abut against the side wall of the blocking member 114 opposite that engaged by the movable bolt 110. The blocking member 114 and the movable bolt 110, together with the adjustment screw 120, are arranged so that in the position shown in FIG. 8 the arm 70 extends "on center" in longitudinal alignment with the collet 22. Preferably, the engaging face 118 of the bolt 110 is tapered by approximately 2° so that a strong wedging action is formed in cooperation with the tapered face 117 of the blocking member 112 on the one side and screw 120 on the other side of the block 114.

As seen in FIG. 9, the spring biased bolt 110 is of a length sufficient that it can be retracted into the confines of the boss 96 as shown, by a distance equivalent to the depth of the blocking member 114 and thereby be free of engagement with the blocking member. This allows the manual movement of the handle 106 in the direction of the arrow A in FIG. 9 to disengage the spring biased bolt 110 prior to any rotary movement of the turret itself. This is further assurance that an inadvertent movement of the handle 106 will not disrupt the position of the arm 70 while the drill bit is extending through the bushing 72.

However, once the spring biased bolt 110 is withdrawn into its rearwardmost position (FIG. 9), further rotation of the handle 106 will cause the turret 67 to rotate conjointly with the boss 96 through the angle permitted by the cut out corner 100, which, as seen in FIG. 10, is approximately 90°. The turret 67 is stopped and comes to rest when the edge of the boss, indicated by the adjustment screw 120, rests against the flat chamfered face 100 of the body 60. In this position, the arm 70 is pivoted, as seen in the extreme broken line position of FIG. 10, completely out of the vicinity of the collet 22 so that the workpiece in the collet can be removed and a new workpiece inserted into the collet.

On restoration of the turret 67 to the position shown in FIG. 8, by reversing the movements of the handle 106 shown in FIGS. 10 and 9, back to its full line position as shown in FIG. 7, the arm 70 will be placed, without any need for further adjustment, in exactly the same position as it had been during the operation on the prior workpiece. The movement of the handle requires a single action in order to reseat the spring loaded bolt 110 wedged in position against the member 114. When the turret is returned to its initial starting position, the handle 106 automatically aligns with the arm 70 and releases the bolt 110 for automatic re-engagement with the block 114 when the lock face 118 aligns with the face 117. This assures the operator that the turret 67 is fixed into place as indicated in FIG. 8, and that the bushing 72 is in the proper position for the continuance of the workpiece.

From the foregoing, it will be clear that the present invention provides a drill jig which is easily adaptable for use with a conventional Hardinge fixture to provide rotary rotating workpieces with a plurality of holes, concentric to a central axis. The drill jig can be positioned in any selected adjustable position vertically above the collet 22 of the Hardinge fixture by movement of the body 60 along the dovetailed portion of the mounting plate 46. Adjustment of the central axis of the bushing 72 of the jig can also be made in the horizontal direction by movement of the arm 70 within the dovetail 68 of the turret 67. This axis may be formed to coincide with the axis of the collet 22 as indicated, or with any other selected axis or point.

The arm 70 carrying the bushing 72 is, of course, movable in a horizontal direction and is adjustable in any selected position with respect to the central axis x of the Hardinge fixture. Further, the provision of the gauging bridge 80 and pin 82 and the ability to readily position a selected measuring block 86 between the pin and the bridge can assure perfect displacement of the arm 70 and bushing 72 without the need for cumbersome and complicated measuring procedures performed between the arm, the bushing and the axis x of the Hardinge flange. Mounting of the arm 70 in the indexing turret 67 enables the movement of the arm into and out of position repeatedly and successively, without the need for regauging, remeasurement or resettings.

Several modifications and changes have been suggested in the foregoing disclosure, and others will be obvious to those skilled in the present art. Accordingly, it is intended that the present disclosure be taken as illustrative only and not as limiting of the present invention. 9n

What is claimed is:

1. Apparatus for facilitating the drilling of holes in a workpiece by a drill press, said drill press including a drill defining a drill axis, said apparatus comprising a fixture securable to said drill press for holding a workpiece in alignment with the axis of the drill, a drill jig for positioning the drill relative to said workpiece comprising a support body, coupling means for adjustably mounting said body on said fixture in one of a selected plurality of positions along a line parallel to the axis of the drill, a drill bushing having an axis, an arm adapted to carry said drill bushing and movably mounted in said body to be adjustable along a plane perpendicular to the axis of the drill and to adjust the axis of the bushing relative the workpiece, said body being provided with a dovetail groove and said coupling means for mounting said body on the fixture comprising a plate coupled to said drill press and fixedly securable to said fixture and having beveled edges conforming to said dovetail groove, said plate being accommodated in said groove, said groove and plate having a longitudinal axis parallel to the axis of the drill, and means for locking said plate in said groove to said plate at selected positions therealong, said fixture including a turret, a housing for said turret, a collet for holding the workpiece mounted in said turret, said turret being rotatable about a vertical axis parallel to the axis of the drill, and a web on said housing including a vertical wall relative to which said turret is rotatable, said vertical wall and plate having cooperating slot and detent means for interlocking the same which consists of said vertical wall being provided with a vertically aligned slot and including a spline and said plate including detent means for fitting in said slot and an elongated opening for receiving said spline for further interlocking said vertical wall and plate, said vertical wall being provided with a further opening facing said plate and said web including means defining a hole adjacent the latter said opening, said plate including an L-shaped block protruding through the latter said opening and engaging in said hole.

2. The apparatus according to claim 1 wherein said collet defines an axis, said apparatus further including means for indexing said arm between a position wherein an extension of the arm intersects the axis of the collet and a position angularly offset therefrom whereby the arm is removed from the vicinity of the collet to clear the latter for the mounting of the workpiece.

3. The apparatus according to claim 1 wherein said plate and housing include respective footing flanges for connection to said drill press.

4. The apparatus as claimed in claim 1 comprising tightening means for tightening said block against said plate.

* * * * *